United States Patent [19]

Sprague

[11] Patent Number: 5,053,161

[45] Date of Patent: Oct. 1, 1991

[54] COMPOSITION FOR INHIBITING SCALE IN WATER SYSTEMS

[75] Inventor: Sherman J. Sprague, Twinsburg, Ohio

[73] Assignee: The Mogul Corporation, Chagrin Falls, Ohio

[21] Appl. No.: 205,117

[22] Filed: Jun. 10, 1988

[51] Int. Cl.$^5$ .............................................. C02F 5/14
[52] U.S. Cl. ................................. 252/180; 210/699; 252/389.2; 252/389.23; 422/15
[58] Field of Search ................... 210/698, 699, 701; 422/15-17; 252/180, 181, 389.2, 389.23

[56] References Cited

U.S. PATENT DOCUMENTS

| | | | |
|---|---|---|---|
| 3,505,238 | 4/1970 | Liddell | 252/180 |
| 3,666,664 | 5/1972 | Lorenc et al. | 210/700 |
| 3,959,167 | 5/1976 | Hwa et al. | 252/180 |
| 3,992,318 | 11/1976 | Gaupp et al. | 252/181 |
| 4,026,815 | 5/1977 | Kallfass et al. | 252/180 |
| 4,048,066 | 9/1977 | Cuisia et al. | 210/701 |
| 4,164,574 | 8/1979 | Quinlan | 252/180 |
| 4,239,648 | 12/1980 | Marshall et al. | 422/15 |
| 4,255,259 | 3/1981 | Hwa et al. | 210/699 |
| 4,389,324 | 6/1983 | Keller | 210/701 |
| 4,556,943 | 12/1985 | Cuisia | 252/180 |
| 4,576,722 | 3/1986 | Gaylor et al. | 210/701 |
| 4,663,053 | 5/1987 | Geiger | 210/699 |
| 4,713,195 | 12/1987 | Schneider | 252/180 |

*Primary Examiner*—Peter Hruskoci
*Attorney, Agent, or Firm*—Pearne, Gordon, McCoy & Granger

[57] ABSTRACT

This invention is directed to the treatment of aqueous systems and specifically to the inhibition and removal of scale and solid deposits in industrial water systems. The invention comprises the use of substoichiometric amounts of an inhibitor composition comprising at least one acrylic polymer, at least one water-soluble polymer derived from maleic acid or its anhydride, a water-soluble organic phosphonate and at least one water-soluble chelating agent. This inhibitor composition is added to the water in the systems in amounts ranging from about 0.01 to 600 parts of the inhibitor per million parts by weight of the water.

1 Claim, No Drawings

COMPOSITION FOR INHIBITING SCALE IN WATER SYSTEMS

This invention is directed to the treatment of aqueous systems and more specifically to the inhibition and removal of scale and solid deposits in various industrial heating and cooling systems. This invention relates to a novel composition and a method for treating aqueous systems to prevent the accumulation of mineral scale and corrosion which comprises adding to the water less than a stoichiometric amount, based on the weight of the water, of a water-soluble composition comprising an acrylic polymer having an average molecular weight ranging up to 50,000; a small but effective amount of a polymer derived from maleic acid or the anhydride of maleic acid having an average molecular weight ranging up to about 5,000 an effective but small amount of at least one organic phosphonate, and at least one water-soluble organic chelant.

The water used in industrial systems such as in steam generating boilers, hot water heaters, heat exchangers, cooling towers, pipelines, gas scrubbing systems and related equipment accumulate various impurities derived from the water. These impurities generally include the alkaline earth cations such as calcium, barium and magnesium and some bicarbonates and carbonates, sulphates, phosphates, silicates and the like. The most common impurities in industrial water are the water-hardening ions including calcium, magnesium and the carbonate ions. In addition to precipitating as carbonates, calcium and magnesium as well as the other metals such as iron or copper react with the sulphates or phosphates to form the respective insoluble complex salts. These reaction products accumulate on the surfaces of the system forming a scale and sludge which substantially reduce the transfer efficiency by settling in the systems and limit the circulation of the water and by acting as insulation on the heat transfer surfaces. Moreover, in addition to interfering with the fluid flow and heat transfer, corrosion of the metal surfaces is promoted, since the corrosion inhibitors generally added to the water are not able to contact the surfaces to provide protection against these reagents. Further, these deposits harbor bacteria, the removal of which is expensive due to delays in shutdown, etc. In high-temperature, steam-generating boilers, hard waters are especially susceptible to the formation of scale causing severe accumulations which result in overheating and in some instances, rupturing of the boilers. Factors which influence the formation of scale include insolubility of the various inorganic materials such as calcium carbonate and calcium sulphate which has a tendency to become super-saturated as the water evaporates. This scale may be controlled by prior treatment to remove the metal-forming constituents from the water. However, the use of internal treatment is more economical and requires no capital expenditures as required for the pre-treatment of water.

Accordingly, this invention relies on the use of a specific composition comprising a combination of water-soluble acrylic polymers and polymers derived from maleic acid or the anhydride thereof together with a combination of an organic phosphonate and a chelating agent. This scale inhibiting composition may be used in small but effective amounts, i.e. substoichiometric amounts to react with the metallic ions found in the water and prevent the adherence of mineral scale to the surfaces of the heat transfer equipment.

BACKGROUND

Combinations of organic inhibitors such as organic phosphonic acids together with polymeric acrylics have been used in aqueous systems. However, the addition of chelating agents to steam generators, for example, to prevent the deposition of metallic ions has been based on the addition of stoichiometric amounts of the chelating agents to the water. These methods require precise control of the chemical addition, since the chelant, for example, if added in less than stoichiometric amounts leads to hardness deposition while any overfeeding has a tendency to cause corrosion due to the by-products generated in the form of insoluble salts which deposit in the system and impair the efficiency of heat transfer.

Other methods attempting to prevent mineral deposits in aqueous systems, i.e. steam generating systems, include the use of phosphonates in combination with various polymeric dispersents. A problem with this combination of materials, however, is that a large volume of suspended solids are formed by the precipitating reaction products which require large blowdowns and therefore reduced efficiency of the system.

In accordance with this invention, the chemical feed problem associated with the fluctuation of the quality of the feed water is designed to prevent an accumulation of excess chelating agent by utilizing a combination of an acrylic acid polymer and polymers derived from maleic acid with at least one organic phosphonate which react with the feed water minerals when the chelant is deficient. It was found that by utilizing a combination of polymers with an organic phosphonate and a chelating agent there was a reduction in the amount of suspended solids with a decrease in the deposition of the various mineral salts resulting in an increase in efficiency which minimizes the needs for maintenance and equipment repair.

There have been various attempts to overcome the problems relating to corrosion and mineral salt deposition in aqueous systems some of which have been solved by the use of various chelating agents in combination with phosphonates as disclosed in U.S. Pat. No. 3,666,664. Here the water-soluble anionic polymers are used in combination with a chelating agent and a phosphonate. Similarly, U.S. Pat. No. 3,959,167 discloses a composition for inhibiting the accumulation of scale on heating surfaces in an aqueous system which comprises an acrylic polymer together with a chelant and an organo phosphonic acid. Further, U.S. Pat. No. 4,255,259 discloses a composition for inhibiting scale in aqueous systems comprising a co-polymer of styrene sulphonic acid with maleic anhydride and a water-soluble phosphonic acid or salt. Similarly, U.S. Pat. No. 3,706,717 discloses that scale deposits can be controlled or prevented in aqueous systems by the addition of acrylic acid polymers in combination with corrosion inhibiting sequestrants. The use of acrylic acid polymers with phosphorous acid products have been suggested for treating aqueous systems by U.S. Pat. Nos. 4,239,648 and 4,159,946.

SUMMARY

To avoid many of the problems associated with industrial aqueous systems such as steam-generating boilers, hot water heaters, heat exchangers, and the like, it has been found that the unique composition of this invention may be used in small but effective amounts i.e. substoichiometric amounts to effectively inhibit the accumulation of mineral scale and prevent corrosion that normally takes place in aqueous systems. The water-soluble composition of this invention comprises a combination of from about 0.5 to 1.5 parts by weight of at least one acrylic acid polymer including the acrylic and methacrylic acid homopolymers, copolymers, and terpolymers having average molecular weights ranging up to about 50,000; from about 0.5 to 1.5 parts by weight of at least one water-soluble polymer derived from maleic acid or the anhydride of maleic acid including the homopolymers, copolymers and terpolymers of maleic acid having average molecular weight ranging up to about 5,000; and from about 0.5 to 1.5 part of a weight of at least one water-soluble organic phosphonate, and from about 0.1 to 0.5 parts by weight of at least one water-soluble chelating agent.

This composition can be added to the aqueous system to prevent the accumulation of scale, sludge and corrosion by adding to the water a substoichiometric amount of the composition comprising the acrylic polymer, the maleic acid polymer, the organo phosphonate and the chelating agent in the related proportions taught herein. Specifically, the composition of this invention may be added to the aqueous systems to prevent the accumulation of scale in substoichiometric amounts ranging from about 0.01 to 600 parts by weight per million parts by weight of the water and preferably the inhibitor composition is added to the aqueous systems in an amount ranging from about 1.0 to about 200 parts by weight of said composition, i.e., the acrylic polymer, the maleic acid polymer, the phosphonate and the chelant for every million parts by weight of water in the system.

DETAILED DESCRIPTION

More specifically, this invention relates to a novel composition for inhibiting scale and corrosion of metal and to prevent the deposition of mineral scale in aqueous systems such as steam boilers, cooling towers, and various other industrial aqueous systems by adding to the water an inhibitor composition which comprises, parts based on a million parts by weight of the water, from about:

(a) 0.5 to 1.5 and preferably approximately 1.0 part by weight of at least one acrylic polymer having average molecular weights ranging up to about 50,000 and preferably average molecular weights ranging from about 1,000 to 5,000, and (b) from about 0.5 to 1.5 parts by weight and preferably approximately 1.0 part by weight of at least one water-soluble polymer derived from maleic acid or maleic acid anhydride having average molecular weights ranging up to about 5,000 and preferably average molecular weights ranging from about 500 to 1,000, and (c) from about 0.5 to 1.5 and preferably 1.0 part by weight of at least one water-soluble organic phosphonate, and from about 0.1 to 0.5 and preferably about 0.3 parts by weight of at least one water-soluble chelating agent.

The composition is added to systems to prevent the accumulation of scale and corrosion by adding to the water in the system a substoichiometric amount i.e. amounts less than sufficient to react with the scale forming anions and cations. Preferably, the water-soluble composition is added to the aqueous systems in substoichiometric amounts ranging from about 0.01 to 600 and more preferably in amounts ranging from 1.0 to 200 parts by weight of the water-soluble composition per million parts by weight of water. The precipitation of the scale forming materials can be prevented by inactivating their cations with the composition of this invention so that the solubility is not exceeded to the point where the compounds deposit on the metal surfaces.

To accomplish these results it was found that various organo phosphonates are effective in threshold or substoichiometric amounts to sequester the scale forming ions. For purposes of this invention the phosphonates are used in the composition in amounts or ratios ranging from about 0.5 to 1.5 and preferably 1.0 part by weight for every 0.1 to 0.5 part by weight and preferably 0.3 parts by weight of the chelant. More specifically, these phosphonates may be characterized by formulae I, II, and III:

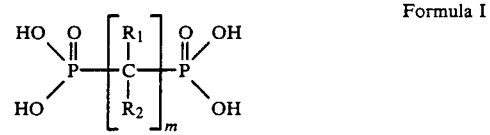

Formula I

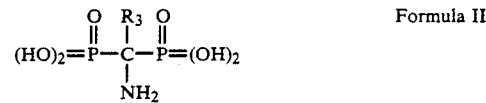

Formula II

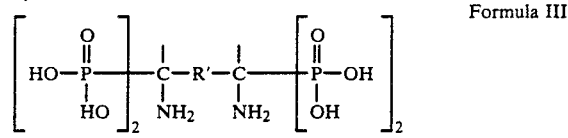

Formula III 1,6diaminohexane-1, 1,6,6-tetraphosphonic acid; 1–10 aminoethane-1, 1-diphosphonic acid monethyl ester, and 1-amino-2-phenylethane-1, 1-diphosphonic acid.

In addition, the water-soluble salts of these acids such as the alkali metal, alkaline earth metal, ammonium, amine and lower alkanol amine salts are useful. The esters of these acids with aliphatic alcohols having from 1 to 4 carbons, or mixtures of the above acids, salts or esters can be used. Mixtures of any of the organo-phosphonic acid compounds described herein are contemplated to be within the scope of this invention. Also included are the compounds disclosed in U.S. Pat. Nos. 3,214,454 and 3,297,578. Other useful compounds include the methanol phosphonic acid derivatives having the following Formula:

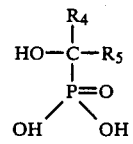

where $R_4$ is independently selected from the group consisting of an alkyl group up to four carbon atoms and phosphonate groups, and $R_5$ is selected from the group consisting of alkyl groups having up to 4 carbon atoms, when $R_4$ is a phosphonate wherein m is an integer from 1 to 10, $R_1$ is hydrogen, or an alkyl group having from 1 to 4 carbons and $R_2$ is hydroxyl, hydrogen, or an alkyl group having from 1 to 4 carbons, $R_3$ is an alkyl group having 1 to 8 carbons, benzyl or phenyl, $R'$ is an aliphatic radical having from 1 to 8 carbons, and including the water-soluble salts, esters and mixtures thereof.

The preferred organic phosphonic acid compounds of this invention are the alkylene diphosphonic acids as taught, for example, by U.S. Pat. No. 3,303,139, the disclosure of which is incorporated herein by reference. Specific acids include methylenediphosphonic acid; ethylidenediphosphonic acid; isopropylidenediphosphonic acid; 1-hydroxy, ethylidenediphosphonic acid; hexamethylenediphosphonic acid; trimethylenediphosphonic acid; decamethylenediphosphonic acid; 1-hydroxy, propylidenediphosphonic acid; 1,6-dihydroxy, 1,6dimethyl, hexamethylenediphosphonic acid; 1,4-dihydroxyl, 1,4dimethyl, tetramethylenediphosphonic acid; 1,3-dihydroxy 1,3-dipropyl, trimethylenediphosphonic acid; 1,4-dibutyl, tetramethylenediphosphonic acid; dihydroxy, diethyl, ethylenediphosphonic acid; 4-hydroxy, 6-ethyl, hexamethylenediphosphonic acid; 1-hydroxy, butylidenediphosphonic acid; butylidenediphosphonic acid; 1-aminoethane-1, 1-diphosphonic acid; 1-aminopropane-1, 1-diphosphonic acid; 1-aminobenzyl-1, 1-diphosphonic acid; group and

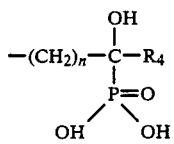

where n is 0 to 6, when $R_4$ is an alkyl group and the water-soluble salts thereof.

For purposes of this invention, specific phosphonic acid compounds include, for example, 1-hydroxy, ethylidene diphosphonic acid; 1-hydroxy, propylidene diphosphonic acid; 1,6-dihydroxy-1, 6-dimethyl, hexamethylene diphosphonic acid (i.e., tetramethylene bis (methyl methanol phosphonic acid); 1,4-dihydroxy-1, 4-diethyl, tetramethylene diphosphonic acid (i.e., dimethylene bis-(ethylmethanol phosphonic acid); 1,3-dihydroxy-1, 3-dipropyl trimethylene diphosphonic acid (i.e., methylene bis (propylmethanol phosphonic acid); bis(ethylemethanol phosphonic acid) and the alkali metal salts.

The water-soluble composition of this invention utilizes an acrylic polymer which includes a variety of polycarboxylates or water-soluble polar polymers such as the acrylic acid polymers used as conditioners in industrial water systems. More specifically, a small quantity of the acrylic polymer improves the fluidity of the precipitated sludge by forming frangible precipitates that are easily removed instead of the hard or dense crystals that form scale. The dispersed solid particles are suspended by the acrylic polymers and carried through the system by the flow of the water or by blowdown.

These water-soluble acrylic polymers include polymers having repeated groups of the formula:

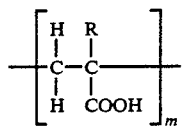

wherein R is hydrogen or a methyl group and the water-soluble salts or esters of these acrylic polymers.

The acrylic polymers for use in this invention are the acrylic or methacrylic acid and the derivatives, for example, acrylic acid, the alkali metal and ammonium salts of acrylic acid, esters of acrylic acid with lower ($C_1$ to $C_4$) alkanols, methacrylic acid, esters of methacrylic acid with lower ($C_1$ to $C_4$) alkanols, and copolymers of these acrylic acids and derivatives with each other. Specifically, these polymers include, for example, polyacrylic acid, ammonium polyacrylate, sodium polyacrylate, ammonium polymethacrylate, dimethylaminoethyl polymethacrylate, methacrylic acid-dimethylaminoethyl methacrylate copolymer, acrylic acid-methacrylic acid copolymer, and the like. The preferred polymers are polyacrylic acid, polymethacrylic acid, and the water-soluble salts of these polymers having a molecular weight ranging from about 50 to 50,000.

Other examples of polymers of acrylic acid and methacrylic acid, include the water-soluble homopolymers of acrylic acid; homopolymers of methacrylic acid; the copolymer of acrylic acid and methacrylic acid; a copolymer of acrylic acid and/or methacrylic acid with other polymerizable ethylenically unsaturated monomers; e.g. crotonic acid, maleic acid or its anhydride, vinyl sulfonic acid, vinyl phosphonic acid, vinyl acetate, ethyl vinyl ether, acrylamide, ethyl acrylate and ethyl methacrylate and the like.

In addition to the acrylic polymers, it was found that polymers of maleic acid or its anhydride or the copolymers of maleic acid and its anhydride are effective water conditioners particularly useful in treating the feedwater to boilers, evaporators and the like. Particularly useful maleic polymers include the water-soluble low molecular weight linear copolymers of maleic anhydride copolymerized with ethylenically unsaturated compounds such as ethylene, propylene, butylene, vinyl acetate, acrylonitrile, acrylic acid, methyl acrylate, ethyl acrylate, methyl vinyl ether, sodium vinyl sulfonate, styrene and the like. These copolymers can be characterized by the formula:

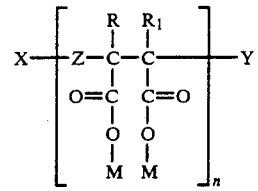

wherein R and $R_1$ are hydrogen or an organic radical having from 1 to 8 carbon atoms wherein R and $R_1$ are the same or different, Z is an organic radical having 1 to 8 carbon atoms, M is hydrogen, ammonium or an alkali metal; n is an integer, and X and Y are end groups of hydrogen or a short chain organic group of 1 to 4 carbons.

Other water-soluble anionic polymers are the maleic anhydride and styrene copolymers as set forth in U.S. Pat. No. 2,723,956 and U.S. Pat. No. 3,549,538. Additional maleic anhydride copolymers for water treatment purposes are disclosed in U.S. Pat. Nos. 4,255,259 and 4,306,991; the disclosures of which are incorporated herein.

The acrylic polymers and the polymers derived from maleic acid or its anhydride are present in the composition in ratios ranging from about 0.5 to 1.5 parts by weight and preferably in a ratio of about 1.0 part by weight for every 0.1 to 0.5 and preferably 0.3 parts by weight of chelant. In other words, the acrylic polymer, maleic acid polymer and organic phosphonate are present in the composition in a preferred ratio of about 1.0 part by weight to each of the two polymers and the phosphonate for every 0.3 parts by weight of the chelant.

Chelating agents are considered an aggressive way of treating water systems in that the chelant can cause serious corrosion problems if used in excessive amounts, but are, however, useful as preventing the deposits of mineral scale. The preferred chelants for purpose of this invention are tetrasodium salt of ethylenediamine tetracetic acid (EDTA) and the trisodium salt of nitrilotriactic acid (NTA). Various mixtures of the chelants i.e. EDTA and NTA may be used as mixtures including a 50/50 mixture.

When used in combination with the acrylic and maleic acid polymers and with one or more phosphonates, the chelants are generally used with these polymers and the phosphonate under "starvation conditions," i.e. substantially no free chelant remains based on the level of hardness in the feed water. Substoichiometric amounts of the chelants are fed i.e. 1.0 to 95% of the hardness equivalent to the system in combination with the phosphonates and the polymers. Any water hardness that does not react with the chelant, i.e. excess hardness is allowed to precipitate and is dispersed with the polyacrylate and the polymaleic acids.

In accordance with this invention, a substoichiometric amount of the inhibitor compositions includes all mole ratios of inhibitor equivalent to the scale forming cations that are less than the amount required for sequestration. The use of substoichiometric amounts is generally referred to as the threshold treatment of water as particularly pointed out in U.S. Pat. No. 3,336,221, the disclosure of which is incorporated herein by reference.

The following examples illustrate that the combination of the polyacrylate and polymers of maleic acid or its derivatives together with an organo phosphonate and a chelant improve scale inhibition in aqueous systems.

EXAMPLE I

| INHIBITOR | RATIOS PARTS BY WEIGHT |
|---|---|
| 1-hydroxyethylidene-1, 1-diphosphonic acid | 0.5 to 1.5 |
| Water-soluble homopolymer of maleic acid | 0.5 to 1.5 |
| Water-soluble polyacrylic acid | 0.5 to 1.5 |
| Tetrasodium salt of ethylenediamine tetracetic acid | 0.1 to 0.5 |

EXAMPLE II

| INHIBITOR | RATIOS PARTS BY WEIGHT |
|---|---|
| 1-hydroxyethylidene, 1-diphosphonic acid | 1.0 |
| Water-soluble polyacrylic acid | 1.0 |
| Water-soluble polymaleic acid | 1.0 |
| Ethylenediamene tetracetic acid tetra sodium salt | 0.33 |

TABLE I

| INHIBITOR COMPOSITION | EXAMPLES A-E | | | | | BASE- LINE |
|---|---|---|---|---|---|---|
| | A | B | C | D | E | |
| | PARTS BY WEIGHT | | | | | |
| 1-hydroxyethylidene; 1-diphosphonic acid | 1.0 | 1.0 | 1.0 | 1.0 | 0 | None |
| Water-soluble polyacrylic acid | 1.0 | 1.0 | 1.0 | 0 | 1.0 | None |
| Water-soluble polymaleic acid | 1.0 | 1.0 | 0 | 1.0 | 1.0 | None |
| Ethylenediamine tetracetic acid tetrasodium salt | 0.36 | 0 | 0.34 | 0.48 | 0.35 | None |
| | PERCENT MINERAL DEPOSITS | | | | | |
| Calcium | 9.0 | 13.9 | 35.6 | 28 | 39.1 | 45.7 |
| Magnesium | 14.3 | 20.0 | 29.0 | 40 | 22.1 | 31.6 |
| Silica | 3.4 | 4.7 | 9.7 | 13.8 | 5.5 | 8.5 |

The data in Table I illustrates (Examples A-E) that when all four (4) inhibitors of the composition were used in their ratios of 1:1:1:0.3 that the percentage of deposits in the system was substantially reduced as shown in example A when compared to the baseline. Moreover, the percent of deposit is substantially lower when comparing the data of example A with examples B through E wherein one of the four (4) inhibitors of the composition was omitted. Thus, it was found that without the unique combination of the phosphonic acid with the acrylic polymer and the maleic acid polymer synergistically functioning with the chelant resulted in substantially improved water treatment in terms of corrosion and scale inhibition. While three of the inhibitors of the composition are better than the baseline as shown in examples B, C, D, and E, the use of a combination of all four inhibitors was an improvement over the baseline and either of the examples B, C, D, or E. The data in Table I illustrates the effectiveness of using the inhibitor composition of this invention in the ratios of approximately 3 parts of the organo phosphonate, the polyacrylic acid and the polymaleic acid with about 1.0 part by weight of the chelant, i.e. ethylenediamine tetra acetic acid tetrasodium salt.

As illustrated by the data in Table I, the addition of a substoichiometric amount of the chelant together with both polymers and the phosphonate enhances the effectiveness of the composition to inhibit the formation of mineral deposits in aqueous systems. The inhibitor composition of this invention helps to keep the scale forming constituents suspended so that they will not adhere to the heat transfer surfaces thereby yielding a cleaner heat transfer unit and more efficient use of energy. Moreover, it was found that in the event the chelant is used in an excessive amount, that will not promote corrosion in the system but will prevent the inorganic ions such as calcium, magnesium and other mineral salts from depositing on the metal surfaces at temperatures as high as 212° F. Previously, the use of boiling water inhibitors was calculated on the use of stoichiometric amounts of the chelant together with the polymers and phosphonates. These prior procedures required precise control of the chemical addition, since the chelant if underfed leads to a deposit of the metal ions and with an overfeed the metal surface has a tendency to corrode and form insoluble products e.g. iron salts that redeposit in the system which impairs the efficiency of heat transfer.

This invention is designed to prevent any accumulation of excessive amounts of the chelant by using a combination of the acrylic and maleic polymers with the phosphonate to react with the feed water minerals when added to the system in substoichiometric amounts.

The inhibitor composition of this invention may be used as a dry powder and permitted to dissolve during the addition to the system, but generally the inhibitor composition is solublized or used in the form of an aqueous solution. These solutions may contain anywhere from 0.01 to 75% by weight of the inhibitors, but preferably from about 1 to 50% by weight. These solutions can be prepared by adding each of the four inhibitors in any order to water at ambient temperatures. The amount of the inhibitor composition added to the aqueous system is substoichiometric which is sufficient to inhibit scale and sludge formation depending on the nature of the water being treated. Generally, however, depending on the source of the water and the hardness thereof, the inhibitor of this invention is added to the system in amounts anywhere from about 0.01 to about 600 parts per million (ppm) and preferably from about 1 to about 200 ppm of water in the system.

In addition, the inhibitor composition of this invention may be used in combination with other known additives customarily employed in water treatment including such compounds as corrosion inhibitors e.g. the triazoles, biocides, and various water treating polymers. The inhibitor is generally added to the makeup or feed water as the water enters the system and typically by means of a calibrated injector to deliver pre-determined amounts periodically or continuously to the water system.

While this invention has been described by a number of specific embodiments it is obvious there are variations and modifications which can be made without departing from the spirit and scope of the invention as particularly set forth in the appended claims.

Invention claimed is:

1. A water-soluble composition for inhibiting the accumulation of mineral scale and corrosion in aqueous systems which consists essentially of from about 1.0 part by weight of a water-soluble polyacrylic acid having an average molecular weight ranging from about 1000 to 5000, about 1.0 part by weight of a water-soluble polymaleic acid having an average molecular weight ranging from about 500 to 1000, about 1.0 part by weight of 1-hydroxyethylidene 1-diphosphonic acid, and about 0.3 part by weight of ethylene-diaminetetraacetic acid sodium salt.

* * * * *

UNITED STATES PATENT AND TRADEMARK OFFICE
CERTIFICATE OF CORRECTION

PATENT NO. : 5,053,161
DATED : October 1, 1991
INVENTOR(S) : Sherman J. Sprague

It is certified that error appears in the above-identified patent and that said Letters Patent is hereby corrected as shown below:

The subject matter at Column 4, line 36 through Column 4, line 63, (ending with "is a phosphonate") should be moved to Column 5, line 23, after "acid;".

Signed and Sealed this

Seventh Day of June, 1994

Attest:

BRUCE LEHMAN

Attesting Officer

Commissioner of Patents and Trademarks